US009851549B2

(12) United States Patent
Yu et al.

(10) Patent No.: US 9,851,549 B2
(45) Date of Patent: Dec. 26, 2017

(54) RAPID AUTOFOCUS METHOD FOR STEREO MICROSCOPE

(71) Applicant: Ningbo University, Ningbo, Zhejiang (CN)

(72) Inventors: Mei Yu, Zhejiang (CN); Yi Liu, Zhejiang (CN); Li Cui, Zhejiang (CN); Shengli Fan, Zhejiang (CN); Yigang Wang, Zhejiang (CN)

(73) Assignee: Ningbo University, Ningbo, Zhejiang (CN)

( * ) Notice: Subject to any disclaimer, the term of this patent is extended or adjusted under 35 U.S.C. 154(b) by 290 days.

(21) Appl. No.: 14/880,169

(22) Filed: Oct. 9, 2015

(65) Prior Publication Data

US 2016/0299329 A1    Oct. 13, 2016

(30) Foreign Application Priority Data

Apr. 10, 2015    (CN) .......................... 2015 1 0166716

(51) Int. Cl.
    *G02B 21/00*    (2006.01)
    *G02B 21/36*    (2006.01)
    *G02B 21/22*    (2006.01)
    *G02B 21/24*    (2006.01)

(52) U.S. Cl.
    CPC ........... *G02B 21/367* (2013.01); *G02B 21/22* (2013.01); *G02B 21/244* (2013.01)

(58) Field of Classification Search
    CPC ..... G02B 21/367; G02B 21/22; G02B 21/244
    USPC ......................................................... 348/46
    See application file for complete search history.

(56) References Cited

U.S. PATENT DOCUMENTS 6,091,843 A * 7/2000 Horesh ................. G01N 21/64
                                                         250/461.1

* cited by examiner

*Primary Examiner* — Jeffery Williams (57) ABSTRACT

A rapid autofocus method for a stereo microscope includes steps of: calculating a disparity of each of stereo microscopic images in a stereo microscopic calibration image sequence; extracting a clear stereo microscopic image sequence from the stereo microscopic calibration image sequence; then, finding out a largest disparity and a smallest disparity among the disparities of all the stereo microscopic images in the clear stereo microscopic image sequence; at a chosen magnification, arbitrarily acquiring a stereo microscopic image; finally, determining a disparity range according to the disparity of the acquired stereo microscopic image, the largest disparity and the smallest disparity, and realizing an autofocus of a target object in the acquired stereo microscopic images. The disparity range is obtained via once off-line calibration at the same magnification, and applicable to the autofocus at an arbitrary timing.

4 Claims, 4 Drawing Sheets

RAPID AUTOFOCUS METHOD FOR STEREO MICROSCOPE

CROSS REFERENCE OF RELATED APPLICATION

This invention claims priority under 35 U.S.C. 119(a-d) to CN 201510166716.3, filed Apr. 10, 2015.

BACKGROUND OF THE PRESENT INVENTION

Field of Invention

The present invention relates to a stereo microscope focusing technology, and more particularly to a rapid autofocus method for a stereo microscope.

Description of Related Arts

Machine vision system is more and more widely applied in the fields of micro manufacture and inspection due to its reliability, relatively cheap price and high output. However, the machine vision system requires highly efficient image processing algorithm for extracting visual characteristics, which further requires the usage of high-quality clear images to guarantee the precision of the visual characteristics. In order to obtain clear images and take the fullest advantage of the potential of the microscope, it is very important to employ an efficient, precise, robust and rapid autofocus method to obtain high-quality clear images.

In general vision systems, focusing is defined as obtaining the clearest image in a series of images by adjusting the objective lens. The autofocus method is divided into two types: the active focusing method and the passive focusing method. The active focusing method comprises steps of: providing different emitting devices on the camera to send signals onto the object; detecting and adjusting the distance between the object and the camera to accomplish focusing. The passive focusing method is to pick out the clearest image by analyzing a series of shot images. Since the equipments for the active focusing method are expensive, the passive focusing method becomes the current research trend. A great amount of conventional passive focusing methods has been put forward, but it still remains uncertain as to choosing the appropriate passive focusing method under different experimental conditions. On one hand, the conventional passive focusing method merely employs the monocular image information. Even if the optimal definition function is determined under the certain experimental condition, due to the lack of the fixed indexes for representing the nature of the images, each time of focusing still needs shooting a large quantity of clear and vague image sequences, which leads to the relatively time-consuming focusing process of the stereo microscope system. On the other hand, the stereo microscope has the depth of field at different magnifications, which means that the images shot within the range of the depth of field are always clear. However, the conventional passive focusing method does not judge whether an arbitrary image is clear or vague, and thus, the researchers merely tend to look for the clearest image, which also consumes much time.

SUMMARY OF THE PRESENT INVENTION

An object of the present invention is to provide a rapid autofocus method for a stereo microscope, the method being capable of rapidly autofocusing an arbitrary stereo microscopic image with a focusing process short in time.

Accordingly, in order to accomplish the above objects, the present invention provides a rapid autofocus method for a stereo microscope, comprising steps of:

① acquiring a stereo microscopic calibration image sequence having M stereo microscopic images, wherein: the M stereo microscopic images in the stereo microscopic calibration image sequence are orderly arranged from vague to clear and then from clear to vague, and contain the same target object; an i th stereo microscopic image in the stereo microscopic calibration image sequence is denoted as $I_i$, wherein: $M \geq 50$ and $1 \leq i \leq M$; each of the stereo microscopic images consists of a left view image and a right view image with the same resolution;

② calculating a disparity of each of the stereo microscopic images in the stereo microscopic calibration image sequence, wherein the disparity of $I_i$ is denoted as $d_i$;

③ extracting a clear stereo microscopic image sequence out of the stereo microscopic calibration image sequence, comprising steps of:

③-1, calculating a value of a Tenengrad function of a left view in each of the stereo microscopic images in the stereo microscopic calibration image sequence with a Tenengrad definition operator; and ③-2, finding out a largest value among the M values of the Tenengrad function and denoting the largest value as $F_{Tm}^L$; according to a range of a depth of field at a chosen magnification, picking out m stereo microscopic images before the stereo microscopic image corresponding to $F_{Tm}^L$, and also m stereo microscopic images after the stereo microscopic image corresponding to $F_{Tm}^L$; and then, constructing the clear stereo microscopic image sequence orderly with the m stereo microscopic images before the stereo microscopic image corresponding to $F_{TM}^L$, the stereo microscopic image corresponding to $F_{Tm}^L$ and the m stereo microscopic images after the stereo microscopic image corresponding to $F_{Tm}^L$; wherein:

a value of m is related to the magnification of an objective lens of the stereo microscope as:

$$m = \frac{n}{2 \times NA \times \Delta h}\left(\lambda + \frac{e}{\beta}\right),$$

wherein: n represents a refractive index of a medium between an object provided on a vertical elevator and the objective lens of the stereo microscope; $\lambda$ represents a light wavelength; e represents a minimal physical distance distinguishable between two neighboring light sensors on an image plane of the stereo microscope; $\beta$ represents the magnification of the objective lens of the stereo microscope; NA represents a numerical aperture of the objective lens of the stereo microscope; $NA = n \times \sin\theta$; $\theta$ represents an angle formed by a refraction light farthest from a central optical axis of the objective lens of the stereo microscope; $\Delta h$ represents a distance by which the vertical elevator moves each time, having a unit of μm; $2 \leq \Delta h \leq 12$;

④ finding out the disparity smallest in value and the disparity largest in value from the disparities of all the stereo microscopic images in the clear stereo microscopic image sequence, respectively denoted as $d_{Cmin}$ and $d_{Cmax}$, wherein an interval $[d_{Cmin}, d_{Cmax}]$ represents a disparity range of clear stereo microscopic images at the chosen magnification;

⑤ at the chosen magnification, arbitrarily acquiring a first stereo microscopic image after imaging by the stereo microscope, denoted as $I_{test}$; calculating the disparity of $I_{test}$, denoted as $d_{test}$; and then realizing an autofocus of a target object in $I_{test}$ according to $d_{test}$ and $[d_{Cmin}, d_{Cmax}]$ comprising steps of:

⑤-1, judging whether $|d_{test}-d_{mc}|<T$ or not; if yes, determining that $I_{test}$ is the clearest image and realizing the autofocus of the target object in $I_{test}$; if no, executing a step ⑤-2; wherein: "| |" is a symbol for counting an absolute value; $d_{mc}$ represents the disparity corresponding to the clearest image in $[d_{Cmin}, d_{Cmax}]$;

$$d_{mc} = \frac{d_{Cmin} + d_{Cmax}}{2}; T$$

represents a designated judgment threshold; $T \in (0,1]$;

⑤-2, supposing that the vertical elevator moves by $\Delta h$ μm each time, calculating times at which the vertical elevator needs to move for focusing the target object in $I_{test}$ to a clearest position, denoted as step, wherein $$step = \frac{d_{test} - d_{mc}}{d_{perstep}};$$

determining a direction towards which the vertical elevator moves for focusing the target object in $I_{test}$ to the clearest position according to step; if step is smaller than 0, determining the direction to be upward; if step is larger than 0, determining the direction to be downward; wherein: $2 \leq \Delta h \leq 20$; $d_{perstep}$ represents an absolute value of a difference between the disparity of the stereo microscopic images acquired before the vertical elevator moves upward or downward at one time and the disparity of the stereo microscopic images acquired thereafter;

⑤-3, moving the vertical elevator at the times, step, and toward the direction for focusing the target object in $I_{test}$ to the clearest position; and ⑤-4 after finishing moving the vertical elevator, acquiring a second stereo microscopic image after imaging by the stereo microscope, denoted as $I_{test}'$; calculating the disparity of $I_{test}'$, denoted as $d_{test}'$; and then, let $I_{test}=I_{test}'$ and let $d_{test}=d_{test}'$, returning to the step ⑤-4 and executing an autofocus iteration, wherein "=" in $I_{test}=I_{test}'$ and $d_{test}=d_{test}'$ is an assignment symbol.

The step ① of "acquiring a stereo microscopic calibration image sequence having M stereo microscopic images" comprises steps of:

①-1, providing the vertical elevator right below the objective lens of the stereo microscope; providing the object on the vertical elevator; observing imaging of the object with the stereo microscope and adjusting a position of the object, in such a manner that the stereo microscopic images after imaging have information of only one plane and contain the target object; and ①-2, adjusting a height of the vertical elevator to blur the stereo microscopic images after imaging; moving the vertical elevator towards the same one direction and acquiring one stereo microscopic image after imaging each time the vertical elevator moves by $\Delta h$ μm, wherein: the vertical elevator moves at M times, so the M stereo microscopic images after imaging are acquired and orderly arranged from vague to clear and then from clear to vague; constructing the stereo microscopic calibration image sequence with the M stereo microscopic images after imaging, wherein: $2 \leq \Delta h \leq 20$ and $M \geq 50$.

The disparity $d_i$ of $I_i$ in the step ②, the disparity $d_{test}$ of $I_{test}$ and the disparity $d_{test}'$ of $d_{test}'$ in the step ⑤ are all acquired through the same process. Respectively defining $I_i$, $I_{test}$ and $I_{test}'$ as to-be-treated images, a process for acquiring the disparity of the to-be-treated images comprises steps of:

a, processing the to-be-treated image with an epipolar line rectification with a quasi-Euclidean epipolar line rectification algorithm, so as to acquire parallel stereo microscopic image; and b, extracting all matching point pairs from a left view image and a right view image of the parallel stereo microscopic image with a SURF algorithm, wherein: for an arbitrary pair of matching points, the matching point pair is formed by two pixel points matched with each other in the left view image and the right view image of the parallel stereo microscopic image; calculating the disparity of each matching point pair, wherein: for an arbitrary matching point pair, the disparity of the matching point pair is acquired by subtracting a horizontal coordinate of the matching point in the right view image of the parallel stereo microscopic image from a horizontal coordinate of the matching point in the left view image of the parallel stereo microscopic image; and then, calculating a mean value of the disparities of all the matching point pairs, wherein the mean value represents the disparity of the to-be-treated image.

Compared with prior arts, the present invention has the following advantages.

1) The present invention employs binocular information of the acquired stereo microscopic images. At the same magnification, the present invention is able to obtain the disparity range of the clear stereo microscopic images through merely one off-line calibration, the disparity range being applicable to the autofocus of the stereo microscopic images shot at an arbitrary time. During autofocusing, the present invention merely executes a few times of iteration for calculating the disparities and a few times of comparison operation upon the shot arbitrary stereo microscopic images. Therefore, the method provided by the present invention saves much focusing time and accomplishes the object of the rapid autofocus.

2) The method provided by the present invention gives the definition of the stereo microscopic image with an index (namely, the disparity) for indicating a nature thereof. Therefore, the method provided by the present invention is able to judge the definition of an arbitrary stereo microscopic image and fills a current gap of definition judgment upon an arbitrary image.

These and other objectives, features, and advantages of the present invention will become apparent from the following detailed description, the accompanying drawings, and the appended claims.

BRIEF DESCRIPTION OF THE DRAWINGS

FIG. 7a is a left view image of final stereo microscopic image, obtained by the rapid autofocus method of the present invention, of the first target object in the stereo microscopic image of FIG. 3a.

DETAILED DESCRIPTION OF THE PREFERRED EMBODIMENT

The present invention is further illustrated in combination of the drawings the preferred embodiment.

Figure 1:
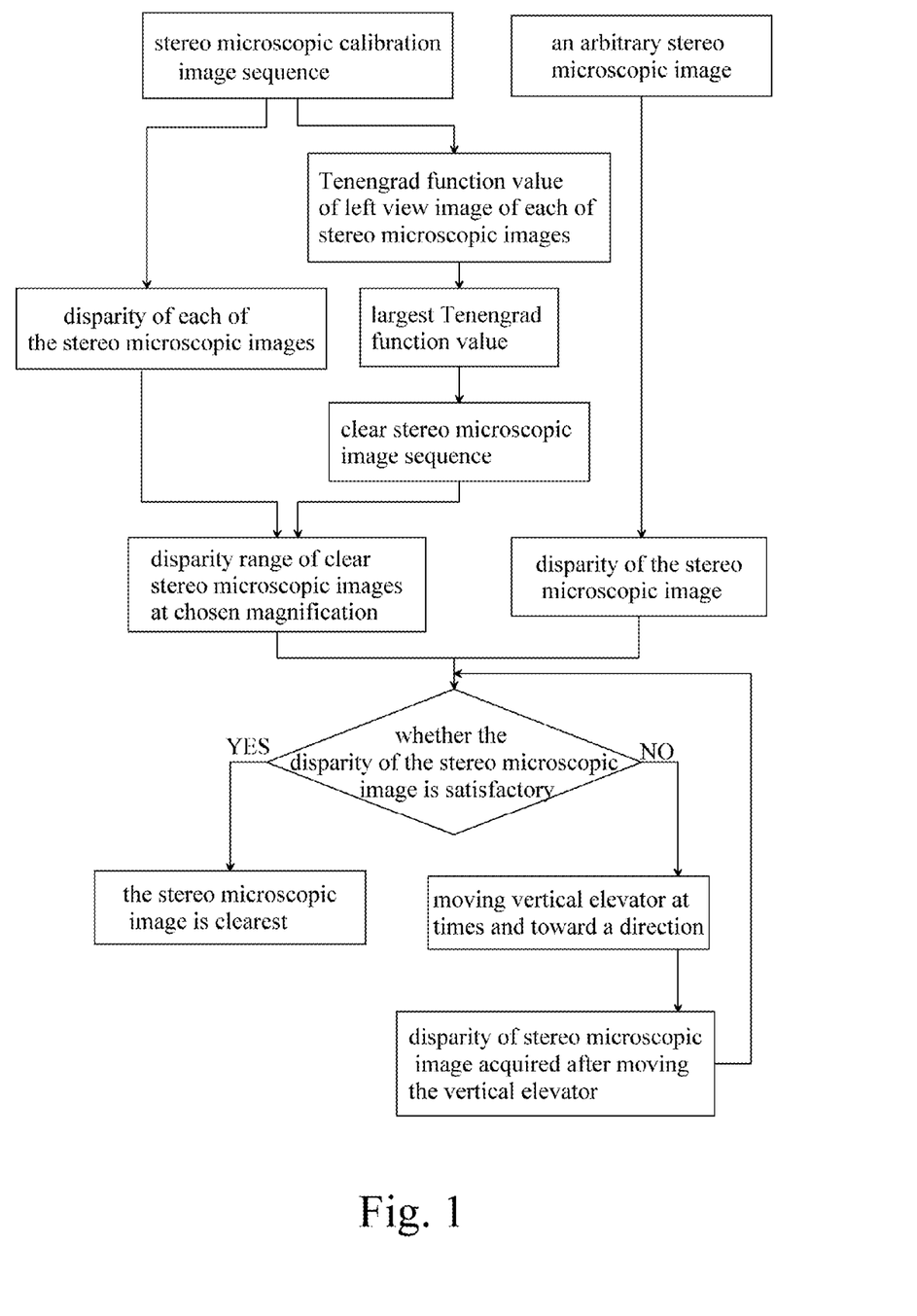
FIG. 1 is a block diagram of a rapid autofocus method for a stereo microscope according to a preferred embodiment of the present invention.
Figure 2A:
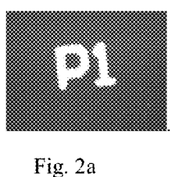
FIG. 2a is a left view image of a first stereo microscopic image which is vague in a stereo microscopic calibration image sequence according to the preferred embodiment of the present invention.
Figure 2B:
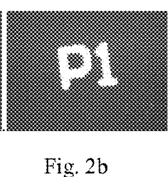
FIG. 2b is a left view image of a second stereo microscopic image which is clear in the stereo microscopic calibration image sequence according to the preferred embodiment of the present invention.
Figure 2C:
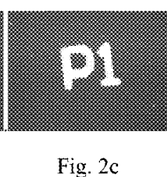
FIG. 2c is a left view image of a third stereo microscopic image which is clearest in the stereo microscopic calibration image sequence according to the preferred embodiment of the present invention.
Figure 2D:
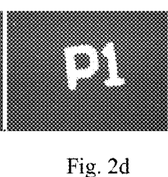
FIG. 2d is a left view image of a fourth stereo microscopic image which is clear in the stereo microscopic calibration image sequence according to the preferred embodiment of the present invention.
Figure 2E:
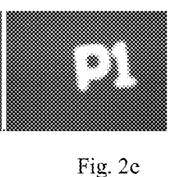
FIG. 2e is a left view image of a fifth stereo microscopic image which is vague in the stereo microscopic calibration image sequence according to the preferred embodiment of the present invention.
Figure 3A:
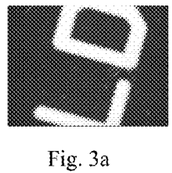
FIG. 3a is a left view image of a stereo microscopic image containing a first target object, acquired when a vertical elevator is at a first height, according to the preferred embodiment of the present invention.
Figure 3B:
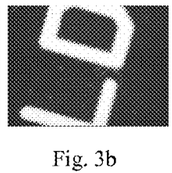
FIG. 3b is a left view image of a stereo microscopic image containing the first target object, acquired when the vertical elevator is at a second height, according to the preferred embodiment of the present invention.
Figure 3C:
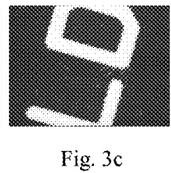
FIG. 3c is a left view image of a stereo microscopic image containing the first target object, acquired when the vertical elevator is at a third height, according to the preferred embodiment of the present invention.
Figure 3D:
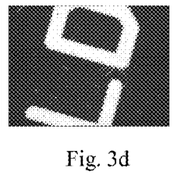
FIG. 3d is a left view image of a stereo microscopic image containing the first target object, acquired when the vertical elevator is at a fourth height, according to the preferred embodiment of the present invention.
Figure 3E:
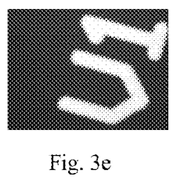
FIG. 3e is a left view image of a stereo microscopic image containing a second target object, acquired when the vertical elevator is at the first height, according to the preferred embodiment of the present invention.
Figure 3F:
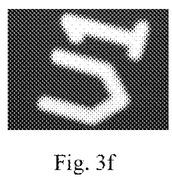
FIG. 3f is a left view image of a stereo microscopic image containing the second target object, acquired when the vertical elevator is at the second height, according to the preferred embodiment of the present invention.
Figure 3G:
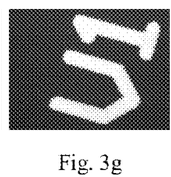
FIG. 3g is a left view image of a stereo microscopic image containing the second target object, acquired when the vertical elevator is at the third height, according to the preferred embodiment of the present invention.
Figure 3H:
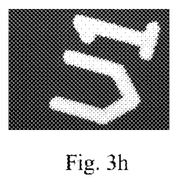
FIG. 3h is a left view image of a stereo microscopic image containing the second target object, acquired when the vertical elevator is at the fourth height, according to the preferred embodiment of the present invention.
Figure 3I:
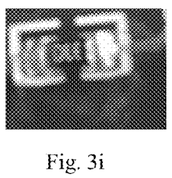
FIG. 3i is a left view image of a stereo microscopic image containing a third target object, acquired when the vertical elevator is at the first height, according to the preferred embodiment of the present invention.
Figure 3J:
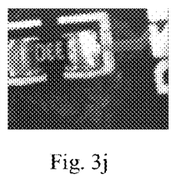
FIG. 3j is a left view image of a stereo microscopic image containing the third target object, acquired when the vertical elevator is at the second height, according to the preferred embodiment of the present invention.
Figure 3K:
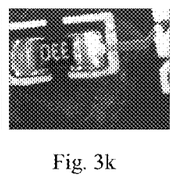
FIG. 3k is a left view image of a stereo microscopic image containing the third target object, acquired when the vertical elevator is at the third height, according to the preferred embodiment of the present invention.
Figure 3M:
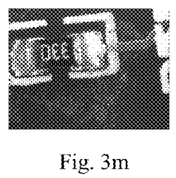
FIG. 3m is a left view image of a stereo microscopic image containing the third target object, acquired when the vertical elevator is at the fourth height, according to the preferred embodiment of the present invention.

Referring to FIG. 1 of the drawings, according to a preferred embodiment of the present invention, a rapid autofocus method for a stereo microscopic comprises the following steps.

Step ①: acquiring a stereo microscopic calibration image sequence which has M stereo microscopic images, wherein: the M stereo microscopic images in the stereo microscopic calibration image sequence are orderly arranged from vague to clear and then from clear to vague, and contain the same target object; an i th stereo microscopic image in the stereo microscopic calibration image sequence is denoted as $I_i$; a left view image and a right view image of $I_i$ are respectively denoted as $I_i^L$ and $I_i^R$; M≥50. According to the preferred embodiment of the present invention, M=150; 1≤i≤M.

According to the preferred embodiment of the present invention, the step of acquiring the stereo microscopic calibration image sequence comprises steps of:

①-1, providing a vertical elevator right below an objective lens of the stereo microscope; providing an object on the vertical elevator; observing imaging of the object with the stereo microscope and adjusting a position of the object, in such a manner that the stereo microscopic images after imaging have information of only one plane and contain the target object. Because the target object is prevented from moving beyond a field of vision of the stereo microscopic images after imaging during a whole process of calibration moving shooting, it is preferable to adjust the target object to be at a center of the whole stereo microscopic image after imaging. Because a background of the stereo microscopic images requires a single color, it is preferable to keep a relatively small brightness change in the background during moving the vertical elevator.

①-2, adjusting a height of the vertical elevator with a precise step motor to blur the stereo microscopic images after imaging; driving the vertical elevator to move towards the same one direction (vertically upward or vertically downward) with the precise step motor (minimal moving step of 2 μm), and acquiring one stereo microscopic image after imaging each time the vertical elevator moves by Δh μm, wherein: the vertical elevator moves at M times, so the M stereo microscopic images after imaging are acquired and orderly arranged from vague to clear and then from clear to vague; constructing the stereo microscopic calibration image sequence with the M stereo microscopic images after imaging, wherein: 2≤Δh≤20; M≥50. According to the preferred embodiment of the present invention, Δh=10; M=150.

FIGS. 2a-2e show left view images of five stereo microscopic images in the stereo microscopic calibration image sequence. According to the preferred embodiment of the present invention, right view images have similar definition with the left view images and thus merely the left view images are shown. The left view images of the stereo microscopic images of FIG. 2a, FIG. 2b, FIG. 2c, FIG. 2d and FIG. 2e are respectively vague, clear, clearest, clear and vague.

Step ②: calculating a disparity of each of the stereo microscopic images in the stereo microscopic calibration image sequence, wherein the disparity of $I_i$ is denoted as $d_i$.

Step ③: extracting a clear stereo microscopic image sequence from the stereo microscopic calibration image sequence, comprising steps of:

③-1, calculating a value of a Tenengrad function of the left view in each of the stereo microscopic images in the stereo microscopic calibration image sequence with a Tenengrad definition operator, wherein: the value of the Tenengrad function of $I_i^L$ is denoted as $F_{i,Tenengrad}^L$;

$$F_{i,Tenengrad}^L = \sum_{x=1}^{W} \sum_{y=1}^{H} (S_X(x, y)^2 + S_Y(x, y)^2),$$

wherein: (x, y) represents coordinates of a pixel point in the stereo microscopic image in the stereo microscopic calibration image sequence; W and H represent a width and a height of the stereo microscopic image in the stereo microscopic calibration image sequence; 1≤x≤W, 1≤y≤H; $S_X(x, y)$ represents a value of the pixel point with the coordinates of (x, y) in $I_i^L$ acquired through a Sobel operator for detecting a horizontal edge; $S_Y(x, y)$ represents the value of the pixel point with the coordinates of (x, y) in $I_i^L$ acquired through the Sobel operator for detecting a vertical edge; and ③-2, finding out a largest value of the Tenengrad function among the M values of the Tenengrad function, denoted as $F_{Tm}^L$; according to a range of a depth of field at a chosen magnification, picking out m stereo microscopic images before the stereo microscopic image corresponding to $F_{Tm}^L$, and also m stereo microscopic images after the stereo microscopic image corresponding to $F_{Tm}^L$; and then, constructing the clear stereo microscopic image sequence orderly with the m stereo microscopic images before the stereo microscopic image corresponding to $F_{Tm}^L$, the stereo microscopic image corresponding to $F_{Tm}^L$ and the m stereo microscopic images after the stereo microscopic image corresponding to $F_{Tm}^L$; wherein:

a value of m is related to the magnification of the objective lens of the stereo microscope as:

$$m = \frac{n}{2 \times NA \times \Delta h}\left(\lambda + \frac{e}{\beta}\right),$$

wherein: n represents a refractive index of a medium between the object provided on the vertical elevator and the objective lens of the stereo microscope; generally the medium is the air, so n=1; λ represents a light wavelength, generally 0.55; e represents a minimal physical distance distinguishable between two neighboring light sensors on an image plane of the stereo microscope, generally 14; μ represents the magnification of the objective lens of the stereo microscope, embodied as μ=8; NA represents a numerical aperture of the objective lens of the stereo microscope; NA=n×sin θ; θ represents an angle formed by a refraction light farthest from a central optical axis of the objective lens of the stereo microscope; according to the preferred embodiment of the present invention, NA=0.01; Δh represents a distance by which the vertical elevator moves each time, having a unit of μm; 2≤Δh≤12; according to the preferred embodiment of the present invention, Δh=10.

Step ④: finding out a smallest disparity and a largest disparity from the disparities of all the stereo microscopic images in the clear stereo microscopic image sequence, respectively denoted as $d_{Cmin}$ and $d_{Cmax}$ wherein an interval $[d_{Cmin}, d_{Cmax}]$ represents a disparity range of clear stereo microscopic images at the chosen magnification.

Step ⑤: at the chosen magnification, arbitrarily acquiring a first stereo microscopic image after imaging by the stereo microscope, denoted as $I_{test}$, wherein: the acquired stereo microscopic images after imaging are generally required to contain a target object; the target object of the acquired stereo microscopic images after imaging can be the same with or different from the target object of each of the stereo microscopic images in the stereo microscopic calibration image sequence; calculating the disparity of $I_{test}$, denoted as $d_{test}$, and judging the definition of $I_{test}$ with $d_{test}$; if $d_{test}$ is out of $[d_{Cmin}, d_{Cmax}]$, judging that $I_{test}$ is unclear; if $d_{test}$ is within $[d_{Cmin}, d_{Cmax}]$, judging that $I_{test}$ is clear; and then realizing an autofocus of the target object in $I_{test}$ according to $d_{test}$ and $[d_{Cmin}, d_{Cmax}]$, comprising steps of:

⑤-4, judging whether $|d_{test} - d_{mc}| < T$ or not; if yes, determining that $I_{test}$ is clearest, so as to realize the autofocus of the target object in $I_{test}$; if no, executing a step ⑤-2;

wherein: "| |" is a symbol for counting an absolute value; $d_{mc}$ represents the disparity corresponding to the clearest images in $[d_{Cmin}, d_{Cmax}]$;

$$d_{mc} = \frac{d_{Cmin} + d_{Cmax}}{2};$$

T represents a designated judgment threshold; T∈(0,1]; according to the preferred embodiment of the present invention, T=0.5;

⑤-2, supposing that the vertical elevator moves by Δh μm each time, calculating times at which the vertical elevator needs to move for focusing the target object in $I_{test}$ to a clearest position, denoted as step, wherein $$\text{step} = \frac{d_{test} - d_{mc}}{d_{perstep}};$$

determining a direction towards which the vertical elevator moves for focusing the target object in $I_{test}$ to the clearest position according to step; if step is smaller than 0, determining the direction to be upward; if step is larger than 0, determining the direction to be downward; wherein: 2≤Δh≤20; according to the preferred embodiment of the present invention, Δh=10; $d_{perstep}$ represents an absolute value of a difference between the disparity of the stereo microscopic images acquired before the vertical elevator moves upward or downward at one time and the disparity of the stereo microscopic images acquired thereafter; according to the preferred embodiment of the present invention, $d_{perstep}$=0.060765;

⑤-3, moving the vertical elevator at the times, step, and toward the direction for focusing the target object in $I_{test}$ to the clearest position; and ⑤-4 because some error exists in a linear relationship between the disparity of the stereo microscopic images and the height of the vertical elevator, it is necessary to calculate the disparity of the stereo microscopic images acquired after the vertical elevator moves, namely acquiring a second stereo microscopic image after imaging by the stereo microscope after finishing moving the vertical elevator, denoted as $I_{test}'$; calculating the disparity of $I_{test}'$, denoted as $d_{test}'$; and then, let $I_{test}=I_{test}'$ and let $d_{test}=d_{test}'$, returning to the step ⑤-4 and executing an autofocus iteration, wherein "=" in $I_{test}=I_{test}'$ and $d_{test}=d_{test}'$ is an assignment symbol.

According to the preferred embodiment of the present invention, the disparity $d_i$ of $I_i$ in the step ⑤, the disparity $d_{test}$ of $I_{test}$ and the disparity $d_{test}'$ of $I_{test}'$ in the step ⑤ are all acquired through the same process. Respectively defining $I_i$, $I_{test}$ and $I_{test}'$ as to-be-treated images, a process for acquiring the disparity of the to-be-treated images comprises steps of:

a, processing the to-be-treated image with an epipolar line rectification with a quasi-Euclidean epipolar line rectification algorithm, so as to acquire parallel stereo microscopic image; and b, extracting all matching point pairs from a left view image and a right view image of the parallel stereo microscopic image with a SURF algorithm, wherein: for an arbitrary pair of matching points, the matching point pair is formed by two pixel points matched with each other in the left view image and the right view image of the parallel stereo microscopic image; calculating the disparity of each matching point pair, wherein: for an arbitrary matching point pair, the disparity of the matching point pair is acquired by subtracting a horizontal coordinate of the matching point in the right view image of the parallel stereo microscopic image from a horizontal coordinate of the matching point in the left view image of the parallel stereo microscopic image; and then, calculating a mean value of the disparities of all the matching point pairs, wherein the mean value represents the disparity of the to-be-treated image.

In order to illustrate validity and feasibility of the rapid autofocus method of the present invention, a circuit board is taken as an experimental shooting object for experiment verification. A test platform of the experiment comprises a digital stereo microscope, a circuit board, a vertical elevator system comprising a three-axis step motor with precise movement and a vertical elevator, a microcontroller and a computer terminal A left camera and a right camera of the digital stereo microscope both have a single-channel image definition of 720×576. The circuit board is provided on the vertical elevator; the step motor is CHUO SEIKI XA07A-R2H which has a minimal moving step of 2 μm and adjusts a moving step according to practical requirements. The microcontroller is an 80C51 microcontroller. The computer terminal sends signals of the moving step and the moving direction to the microcontroller, for controlling the step motor to drive the vertical elevator to move. The computer terminal runs in an environment of Intel Core(TM)i3 CPU 3.19 GHz, 1.74 G Memory, and adopts VS2012 and OPENCV2.4.8 for the experiment.

In the experiment, four stereo microscopic images respectively of three different target objects are chosen for test. FIGS. 3a, 3b, 3c and 3d are left view images of the four stereo microscopic images containing a first target object, acquired when the vertical elevator is at different heights (a height of the vertical elevator distant from the ground). FIGS. 3e, 3f, 3g and 3h are left view images of the four stereo microscopic images containing a second target object, acquired when the vertical elevator is at the different heights. FIGS. 3i, 3j, 3k and 3m are left view images of the four stereo microscopic images containing a third target object, acquired when the vertical elevator is at the different heights.

Figure 4:
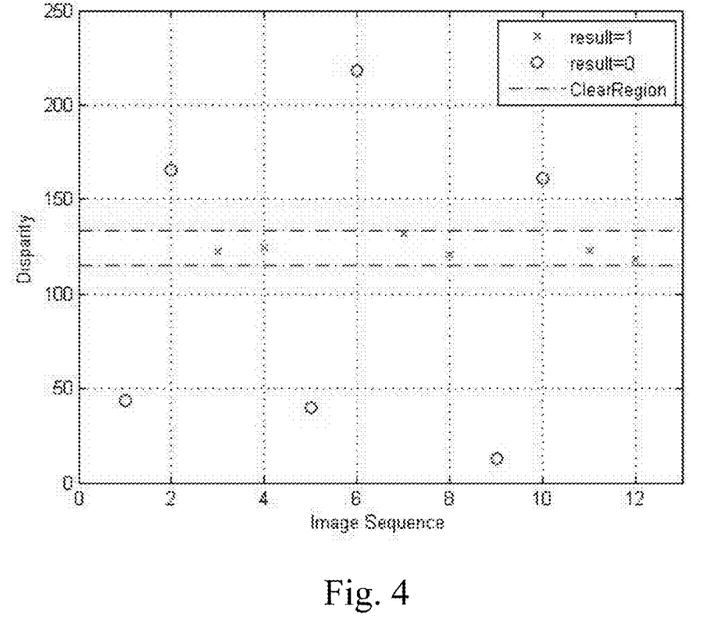
FIG. 4 shows a result of a definition judgment of the stereo microscopic images respectively of FIGS. 3a-3m.

The stereo microscopic images respectively of FIG. 3a-FIG. 3m are processed with the rapid autofocus method of the present invention, so as to obtain evaluation results of disparity and definition of the stereo microscopic images as shown in FIG. 4. A horizontal coordinate of FIG. 4 represents an image number (Image Sequence); numbers 1-12 respectively represent FIGS. 3a, 3b, 3c, 3d, 3e, 3f, 3g, 3h, 3i, 3j, 3k and 3m. A vertical coordinate of FIG. 4 represents a disparity of the stereo microscopic images (Disparity). In FIG. 4, result=1 represents that a result of definition judgment is clear, while result=0 represents that a result of definition judgment is vague; and a dotted line represents disparities of an interval of calibrated clear stereo microscopic images (Clear Region). As shown in FIG. 4, tested stereo microscopic images comprise the clear stereo microscopic images and the vague stereo microscopic images. By choosing the stereo microscopic images at an arbitrary position (may be clear, or may be vague) to autofocus in the test, it is sufficient to prove that the method of the present invention has universality.

Figure 5:
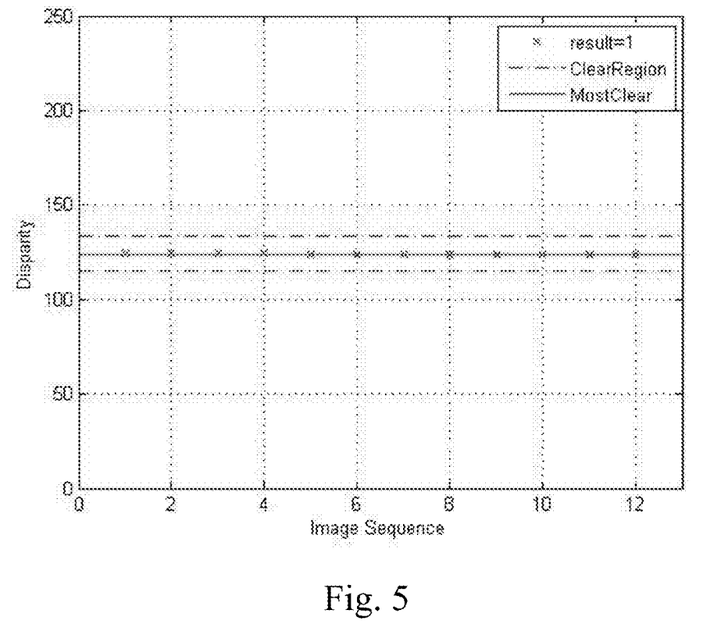
FIG. 5 shows a disparity after iteration of the stereo microscopic images respectively of FIGS. 3a-3m.
Figure 6:
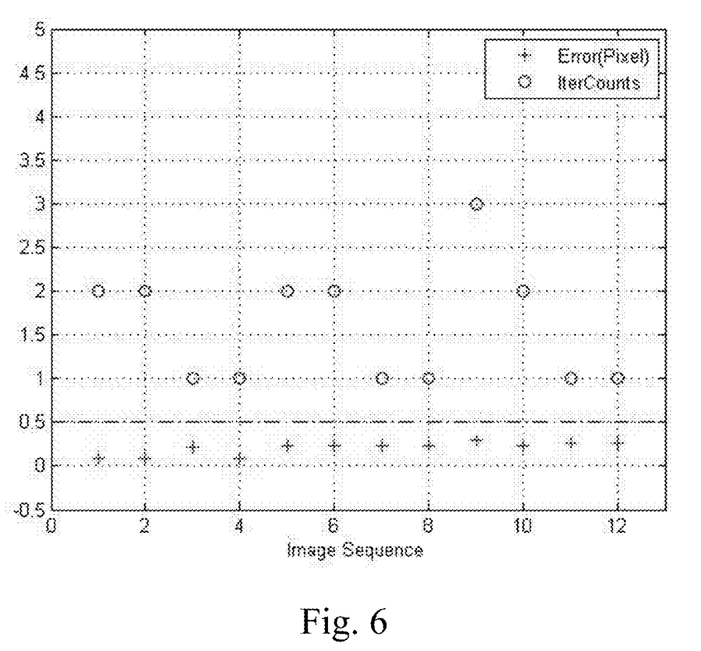
FIG. 6 shows an error after the iteration and iteration times of the stereo microscopic images respectively of FIGS. 3a-3m.
Figure 7A:
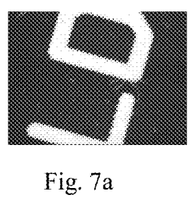
Figure 7B:
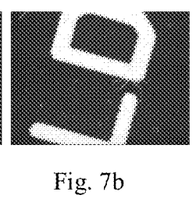
FIG. 7b is a left view image of final stereo microscopic image, obtained by the rapid autofocus method of the present invention, of the first target object in the stereo microscopic image of FIG. 3b.
Figure 7C:
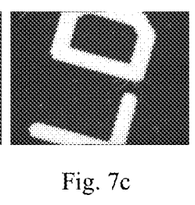
FIG. 7c is a left view image of final stereo microscopic image, obtained by the rapid autofocus method of the present invention, of the first target object in the stereo microscopic image of FIG. 3c.
Figure 7D:
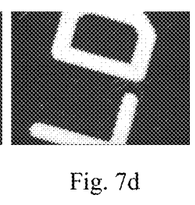
FIG. 7d is a left view image of final stereo microscopic image, obtained by the rapid autofocus method of the present invention, of the first target object in the stereo microscopic image of FIG. 3d.
Figure 7E:
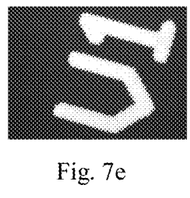
FIG. 7e is a left view image of final stereo microscopic image, obtained by the rapid autofocus method of the present invention, of the second target object in the stereo microscopic image of FIG. 3e.
Figure 7F:
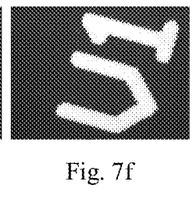
FIG. 7f is a left view image of final stereo microscopic image, obtained by the rapid autofocus method of the present invention, of the second target object in the stereo microscopic image of FIG. 3f.
Figure 7G:
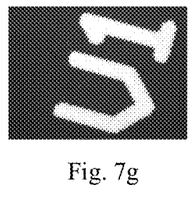
FIG. 7g is a left view image of final stereo microscopic image, obtained by the rapid autofocus method of the present invention, of the second target object in the stereo microscopic image of FIG. 3g.
Figure 7H:
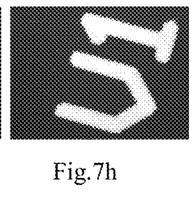
FIG. 7h is a left view image of final stereo microscopic image, obtained by the rapid autofocus method of the present invention, of the second target object in the stereo microscopic image of FIG. 3h.
Figure 7I:
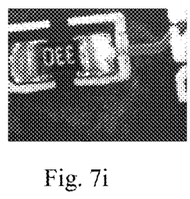
FIG. 7i is a left view image of final stereo microscopic image, obtained by the rapid autofocus method of the present invention, of the third target object in the stereo microscopic image of FIG. 3i.
Figure 7J:
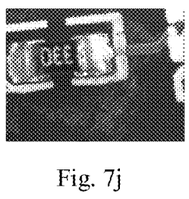
FIG. 7j is a left view image of final stereo microscopic image, obtained by the rapid autofocus method of the present invention, of the third target object in the stereo microscopic image of FIG. 3j.
Figure 7K:
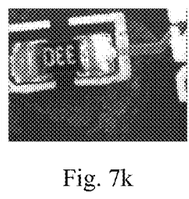
FIG. 7k is a left view image of final stereo microscopic image, obtained by the rapid autofocus method of the present invention, of the third target object in the stereo microscopic image of FIG. 3k.
Figure 7M:
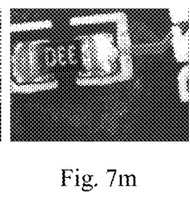
FIG. 7m is a left view image of final stereo microscopic image, obtained by the rapid autofocus method of the present invention, of the third target object in the stereo microscopic image of FIG. 3m.

As shown in FIG. 5, through an iteration of the method of the present invention, final actual disparities of the tested stereo microscopic images are obtained. A horizontal coordinate of FIG. 5 represents the image number (Image Sequence); the numbers 1-12 respectively represent FIGS. 3a, 3b, 3c, 3d, 3e, 3f, 3g, 3h, 3i, 3j, 3k and 3m. A vertical coordinate of FIG. 5 represent a disparity of the stereo microscopic images (Disparity). In FIG. 5, result=1 represents that the result of the definition judgment is clear; the dotted line represents the disparities of the interval of the calibrated clear stereo microscopic images (Clear Region); a solid line represents the disparity of calibrated clearest stereo microscopic images (Most Clear). Through the iteration of the method of the present invention, an iteration final error and corresponding iteration times are shown in FIG. 6. In FIG. 6, "+" represents the iteration final error (Error) and "○" represents the iteration times (Iter Counts). Concluded from FIG. 5 and FIG. 6, an absolute value of an error between an actual disparity of the stereo microscopic image after the iteration and the disparity of the clearest stereo microscopic image is within the designated threshold, namely smaller than 0.5 pixel point; moreover, it takes merely a few iteration times to reach the preset requirement.

FIGS. 7a-7m show left view images of final stereo microscopic images, obtained by the rapid autofocus method of the present invention, of the stereo microscopic images of FIG. 3a-3m. Based on visual effects of FIGS. 7a-7m, the 12 stereo microscopic images are effectively auto focused through the method of the present invention.

Supposing that, under the control of the step motor, a time for the vertical elevator to vertically move by the unit step is $t_{move}$, and a time for the step motor to wait for acquiring the stereo microscopic images is $t_{wait}$, a time for calculating the definition function values is so far less than the above two times as to be negligible. An autofocusing time through a conventional method (continually shooting n' stereo microscopic images to calculate out the clearest image, with an image interval nearly symmetric relative to a focused position) is $(t_{move}+t_{wait}) \times n'$.

As a contrast, in the method of the present invention, the disparity range of the clear image interval is calibrated merely once but applicable for a long term, and thus a time for calibrating is excluded from the autofocusing time. A time of the method of the present invention is mainly consumed by the definition judgment, iteratively moving the vertical elevator, waiting by the step motor and calculating the disparities. Compared to the time for moving the vertical elevator and the time of waiting by the step motor, the rest two times can be neglected. Since a moving range as a whole is nearly symmetric relative to the focused position, the times at which the vertical elevator moves in the method of the present invention is merely half of the times at which the vertical elevator moves in the conventional method, namely n'/2. Given the iteration times $n_d$, the autofocusing time of the method of the present invention is $$t_{move} \times \frac{n'}{2} + t_{wait} \times n_d.$$

A frequency of waiting by the step motor in the conventional method is far higher than a frequency of waiting by the step motor in the method of the present invention, namely n'>>$n_d$. For the platform in the experiment, $t_{wait}$=2s ; $t_{move}$=1s. The autofocusing time of the method of the present invention is about ⅙ of the autofocusing time of the conventional method. Therefore, the method of the present invention has a short autofocusing time.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A rapid autofocus method for a stereo microscope, comprising steps of:
   ①  acquiring a stereo microscopic calibration image sequence having M stereo microscopic images, wherein: the M stereo microscopic images in the stereo microscopic calibration image sequence are orderly arranged from vague to clear and then from clear to vague, and contain the same target object; an i th stereo microscopic image in the stereo microscopic calibration image sequence is denoted as $I_i$, wherein M≥50 and 1≤i≤M; each of the stereo microscopic images consists of a left view image and a right view image with the same resolution;
   ②  calculating a disparity of each of the stereo microscopic images in the stereo microscopic calibration image sequence, wherein the disparity of $I_i$ is denoted as $d_i$;
   ③  extracting a clear stereo microscopic image sequence out of the stereo microscopic calibration image sequence, comprising steps of:
   ③-1, calculating a value of a Tenengrad function of a left view in each of the stereo microscopic images in the stereo microscopic calibration image sequence with a Tenengrad definition operator; and
   ③-2, finding out a largest value among the M values of the Tenengrad function, denoted as $F_{Tm}^L$; according to a range of a depth of field at a chosen magnification, picking out m stereo microscopic images before the stereo microscopic image corresponding to $F_{Tm}^L$, and also m stereo microscopic images after the stereo microscopic image corresponding to $F_{Tm}^L$; and then, constructing the clear stereo microscopic image sequence orderly with the m stereo microscopic images before the stereo microscopic image corresponding to $F_{Tm}^L$, the stereo microscopic image corresponding to $F_{Tm}^L$ and the m stereo microscopic images after the stereo microscopic image corresponding to $F_{Tm}^L$;
   wherein:
   a value of m is related to the magnification of an objective lens of the stereo microscope as:

$$m = \frac{n}{2 \times NA \times \Delta h}\left(\lambda + \frac{e}{\beta}\right),$$

wherein: n represents a refractive index of a medium between an object provided on a vertical elevator and the objective lens of the stereo microscope; λ represents a light wavelength; e represents a minimal physical distance distinguishable between two neighboring light sensors on an image plane of the stereo microscope; β represents the magnification of the objective lens of the stereo microscope; NA represents a numerical aperture of the objective lens of the stereo microscope; NA=n×sin θ; θ represents an angle formed by a refraction light farthest from a central optical axis of the objective lens of the stereo microscope; Δh represents a distance by which the vertical elevator moves each time, having a unit of µm; 2≤Δh≤12;

(4) finding out the disparity smallest in value and the disparity largest in value from the disparities of all the stereo microscopic images in the clear stereo microscopic image sequence, respectively denoted as $d_{Cmin}$ and $d_{Cmax}$, wherein an interval $[d_{Cmin}, d_{Cmax}]$ represents a disparity range of clear stereo microscopic images at the chosen magnification;

(5) at the chosen magnification, arbitrarily acquiring a first stereo microscopic image after imaging by the stereo microscope, denoted as $I_{test}$; calculating the disparity of $I_{test}$, denoted as $d_{test}$; and then realizing an autofocus of a target object in $I_{test}$ according to $d_{test}$ and $[d_{Cmin}, d_{Cmax}]$, comprising steps of:

(5)-1, judging whether $|d_{test}-d_{mc}|<T$ or not; if yes, determining that $I_{test}$ is the clearest image and realizing the autofocus of the target object in $I_{test}$; if no, executing a step (5)-2; wherein: "| |" is a symbol for counting an absolute value; $d_{mc}$ represents the disparity corresponding to the clearest image in $[d_{Cmin}, d_{Cmax}]$;

$$d_{mc} = \frac{d_{Cmin} + d_{Cmax}}{2};$$

T represents a designated judgment threshold; $T \in (0,1]$;

(5)-2, supposing that the vertical elevator moves by Δh µm each time, calculating times at which the vertical elevator needs to move for focusing the target object in $I_{test}$ to a clearest position, denoted as step, wherein $$\text{step} = \frac{d_{test} - d_{mc}}{d_{perstep}};$$

determining a direction towards which the vertical elevator moves for focusing the target object in $I_{test}$ to the clearest position according to step; if step is smaller than 0, determining the direction to be upward; if step is larger than 0, determining the direction to be downward; wherein: 2≤Δh≤20; $d_{perstep}$ represents an absolute value of a difference between the disparity of the stereo microscopic images acquired before the vertical elevator moves upward or downward at one time and the disparity of the stereo microscopic images acquired thereafter;

(5)-3, moving the vertical elevator at the times, step, and toward the direction for focusing the target object in $I_{test}$ to the clearest position; and (5)-4 after finishing moving the vertical elevator, acquiring a second stereo microscopic image after imaging by the stereo microscope, denoted as $I_{test}'$; calculating the disparity of $I_{test}'$, denoted as $d_{test}'$; and then, let $I_{test}=I_{test}'$ and let $d_{test}=d_{test}'$, returning to the step (5)-4 and executing an autofocus iteration, wherein "=" in $I_{test}=I_{test}'$ and $d_{test}=d_{test}'$ is an assignment symbol.

2. The rapid autofocus method, as recited in claim 1, wherein the step (1) of "acquiring a stereo microscopic calibration image sequence having M stereo microscopic images" comprises steps of:

(1)-1, providing the vertical elevator right below the objective lens of the stereo microscope; providing the object on the vertical elevator; observing imaging of the object with the stereo microscope and adjusting a position of the object, in such a manner that the stereo microscopic images after imaging have information of only one plane and contain the target object; and (1)-2, adjusting a height of the vertical elevator to blur the stereo microscopic images after imaging; moving the vertical elevator towards the same one direction and acquiring one stereo microscopic image after imaging each time the vertical elevator moves by Δh µm, wherein: the vertical elevator moves at M times, so the M stereo microscopic images after imaging are acquired and orderly arranged from vague to clear and then from clear to vague; constructing the stereo microscopic calibration image sequence with the M stereo microscopic images after imaging, wherein: 2≤Δh≤20 and M≥50.

3. The rapid autofocus method, as recited in claim 1, wherein: the disparity $d_i$ of $I_i$ in the step (2), the disparity $d_{test}$ of $I_{test}$ and the disparity $d_{test}'$ of $I_{test}'$ in the step (5) are all acquired through the same process; respectively defining $I_i$, $I_{test}$ and $I_{test}'$ as to-be-treated images, the process for acquiring the disparity of the to-be-treated images comprises steps of:

a, processing the to-be-treated image with an epipolar line rectification with a quasi-Euclidean epipolar line rectification algorithm, so as to acquire parallel stereo microscopic image; and b, extracting all matching point pairs from a left view image and a right view image of the parallel stereo microscopic image with a SURF algorithm, wherein: for an arbitrary pair of matching points, the matching point pair is formed by two pixel points matched with each other in the left view image and the right view image of the parallel stereo microscopic image; calculating the disparity of each matching point pair, wherein: for an arbitrary matching point pair, the disparity of the matching point pair is acquired by subtracting a horizontal coordinate of the matching point in the right view image of the parallel stereo microscopic image from a horizontal coordinate of the matching point in the left view image of the parallel stereo microscopic image; and then, calculating a mean value of the disparities of all the matching point pairs, wherein the mean value represents the disparity of the to-be-treated image.

4. The rapid autofocus method, as recited in claim 2, wherein: the disparity $d_i$ of $I_i$ in the step (2), the disparity $d_{test}$ of $I_{test}$ and the disparity $d_{test}'$ of $I_{test}'$ in the step (5) are all acquired through the same process; respectively defining $I_i$, $I_{test}$ and $I_{test}'$ as to-be-treated images, the process for acquiring the disparity of the to-be-treated images comprises steps of:

a, processing the to-be-treated image with an epipolar line rectification with a quasi-Euclidean epipolar line rectification algorithm, so as to acquire parallel stereo microscopic image; and b, extracting all matching point pairs from a left view and a right view of the parallel stereo microscopic image with a SURF algorithm, wherein: for an arbitrary pair of matching points, the matching point pair is formed by two pixel points matched with each other in the left view and the right view of the parallel stereo microscopic image; calculating the disparity of each matching point pair, wherein: for an arbitrary matching point pair, the disparity of the matching point pair is acquired by subtracting a horizontal coordinate of the matching point in the right view of the parallel stereo microscopic image from a horizontal coordinate of the matching point in the left view of the parallel stereo microscopic image; and then, calculating a mean value of the disparities of all the matching point pairs, wherein the mean value represents the disparity of the to-be-treated image.

* * * * *